(12) United States Patent
Minamikawa

(10) Patent No.: US 7,780,187 B2
(45) Date of Patent: Aug. 24, 2010

(54) MOUNTING STRUCTURE FOR CURTAIN AIRBAG

(75) Inventor: Takeki Minamikawa, Tokyo (JP)

(73) Assignee: Takata Corporation, Tokyo (JP)

( * ) Notice: Subject to any disclaimer, the term of this patent is extended or adjusted under 35 U.S.C. 154(b) by 0 days.

(21) Appl. No.: 11/522,443

(22) Filed: Sep. 18, 2006

(65) Prior Publication Data

US 2007/0063490 A1 Mar. 22, 2007

(30) Foreign Application Priority Data

Sep. 20, 2005 (JP) ............................ 2005-272607

(51) Int. Cl.
B60R 21/20 (2006.01)
B60R 21/213 (2006.01)

(52) U.S. Cl. ................. 280/728.2; 24/458; 248/220.41; 248/225.21

(58) Field of Classification Search ............. 280/728.2, 280/730.2; 403/13, 14; 248/220.31, 220.41, 248/225.21, 300; 24/458
See application file for complete search history.

(56) References Cited

U.S. PATENT DOCUMENTS

| | | | | |
|---|---|---|---|---|
| 5,951,046 | A * | 9/1999 | Hosoda et al. | 280/801.2 |
| 6,279,941 | B1 | 8/2001 | Nakajima et al. | |
| 6,305,707 | B1 * | 10/2001 | Ishiyama et al. | 280/728.2 |
| 6,340,169 | B1 * | 1/2002 | Tietze | 280/728.2 |
| 6,520,533 | B2 | 2/2003 | Tanase et al. | |
| 6,540,251 | B1 * | 4/2003 | LeVey et al. | 280/728.2 |
| 6,705,635 | B2 * | 3/2004 | Hoeft et al. | 280/728.2 |
| 6,896,288 | B2 * | 5/2005 | Tanaka et al. | 280/743.2 |
| 7,040,647 | B2 * | 5/2006 | Deligny et al. | 280/728.2 |
| 2003/0042712 | A1 * | 3/2003 | Henderson et al. | 280/728.2 |
| 2004/0012172 | A1 * | 1/2004 | Deligny et al. | 280/728.2 |
| 2004/0136812 | A1 * | 7/2004 | Kawai et al. | 411/508 |
| 2005/0046154 | A1 | 3/2005 | Rhea et al. | |
| 2005/0173902 | A1 * | 8/2005 | Boxey | 280/730.2 |
| 2006/0192368 | A1 * | 8/2006 | Hall et al. | 280/730.2 |

FOREIGN PATENT DOCUMENTS

| | | |
|---|---|---|
| EP | 1 112 900 A2 | 7/2001 |
| JP | 2000-025550 | 1/2000 |
| JP | 2000-247203 | 9/2000 |
| JP | 2002-053003 | 2/2002 |
| JP | 2002-053005 | 2/2002 |
| WO | WO 02/28690 A1 | 4/2002 |

* cited by examiner

*Primary Examiner*—Paul N Dickson
*Assistant Examiner*—Drew Brown
(74) *Attorney, Agent, or Firm*—Foley and Lardner LLP

(57) ABSTRACT

The disclosed mounting component and mounting structure may provide an efficient mounting of a folded curtain airbag and/or may prevent movement of the airbag caused by a vehicle member striking the folded curtain airbag. A mounting component and/or mounting structure may include a base piece configured to be attached to the vehicle body and projecting pieces extending from both ends of the base piece for extending over the folded curtain airbag. The base piece and the projecting pieces can be integrated with each other.

18 Claims, 4 Drawing Sheets

MOUNTING STRUCTURE FOR CURTAIN AIRBAG

BACKGROUND

The present application relates to mounting components for mounting curtain airbags on, for example, roof side rails of vehicle bodies, and relates to mounting structures for curtain airbags using the mounting components.

Known technologies for mounting curtain airbags on vehicle bodies using mounting components are disclosed in Japanese Unexamined Patent Application Publication Nos. 2002-53003 and 2002-53005 (incorporated by reference herein).

In these known devices, folded curtain airbags are disposed along the bottom portions of inverted chevron-shaped mounting components and bound to the mounting components with pieces of tape. The mounting components are attached to the roof side rails using bolts.

According to the mounting components and structures disclosed in the Japanese Publication Nos. 2002-53003 and 2002-53005, the lower sides of the folded curtain airbags having the mounting components attached thereto may be pushed upward or toward the vehicle cabin as a result of a vehicle member (such as a B-pillar facade) striking the airbag during the mounting of the folded curtain airbag onto the roof side rails. Also, the mounting components may be hidden behind the folded curtain airbag. In such cases, the mounting components can be difficult to attach to the roof side rail.

SUMMARY

According to a disclosed embodiment, a mounting component for a curtain airbag capable of preventing a folded curtain airbag from hiding the mounting component even when the folded curtain airbag strikes a B-pillar facade or the like, is provided. As a result, efficient mounting of the folded curtain airbag is provided.

According to one disclosed embodiment, a mounting component is provided, which is used for mounting a folded curtain airbag that extends along a vehicle body. The mounting component may include a base piece superposed on the vehicle body and projecting pieces extending from both ends of the base piece over the folded curtain airbag. Also, the base piece and the projecting pieces may be integrated with each other.

In addition, each of the projecting pieces may include a hanging portion at the end thereof, which extends over a surface of the folded curtain airbag adjacent to the vehicle cabin.

In another disclosed embodiment, an occupant restraint device is provided, which includes a folded curtain airbag that is mounted on a vehicle body using a mounting component. The mounting component may be any of the embodiments of the mounting component as described above. Additionally, the curtain airbag may include a tab protruding therefrom and superposed on the base piece of the mounting component in which the tab can be attached to the vehicle body via the base piece.

Also, the tab may be superposed on a surface of the base piece adjacent to the vehicle cabin, and a retaining piece may be superposed on a surface of the tab adjacent to the vehicle cabin. Furthermore the retaining piece and the base piece may be attached to each other.

Additionally, the folded curtain airbag and the mounting component may be integrated with each other by tape members wound around the folded curtain airbag and the mounting component. The tape members may surround the outer peripheries of the projecting pieces.

According to the various embodiments of the present invention, the upward movement of the folded curtain airbag caused by the folded curtain airbag striking a vehicle member (such as a B-pillar facade) may be prevented by the projecting pieces. Also, according to the disclosed embodiment, the mounting component is not hidden behind the folded curtain airbag, and the mounting component can be easily attached to the vehicle body.

Because the projecting pieces can be disposed at both ends of the base piece, the folded curtain airbag is sufficiently prevented from hiding the mounting component even when the folded curtain airbag is pushed upward at a position remote from the base piece.

When each of the projecting pieces has the hanging portion at the end thereof, the folded curtain airbag is prevented from rotating upward from a position adjacent to the vehicle cabin.

When the projecting pieces are concaved downward and the pieces of tape are wound so as to surround the outer peripheries of the projecting pieces, the movement of the folded curtain airbag can be sufficiently prevented. Also, the pieces of tape are not in contact with angular portions, resulting in improved durability.

When the length of the projecting pieces in the front-back direction of the vehicle body is large, the movement of the folded curtain airbag can be prevented more effectively. When the catching piece is engaged with the catching hole of the vehicle body, the rotation of the mounting component can be prevented more effectively.

When the tab is interposed between the retaining piece and the base piece, the tab can be prevented from warping during the mounting of the curtain airbag. Thus, the installation and mounting of the airbag is more efficient.

It is to be understood that both the foregoing general description and the following detailed description are exemplary and explanatory only, and are not restrictive of the invention as claimed.

BRIEF DESCRIPTION OF THE DRAWINGS

The features, aspects, and advantages of the present invention will become apparent from the following description, appended claims, and the accompanying exemplary embodiments shown in the drawings, which are briefly described below.

DETAILED DESCRIPTION

Embodiments will now be described with reference to the drawings.

Figure 2A:
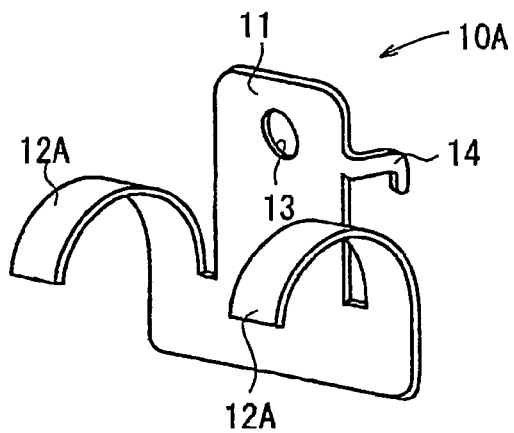
FIG. 2(a) is a perspective view of a mounting component for a curtain airbag according to another embodiment.

As shown in FIG. 2(a), a curtain airbag 1 for restraining the heads of the occupants is mounted on a roof side rail 2 of a vehicle body of an automobile. This curtain airbag 1 may be formed of two layered sheets connected to each other at the peripheries thereof using sewing threads, bonding agents, or the like so as to form a pouched shape. Tabs 3 protrude upward from the upper end of the curtain airbag 1. The tabs 3 each have an opening (an opening 3a shown in FIG. 3(b) as described below) for fixing the curtain airbag 1 to the roof side rail 2. The tabs 3 are attached to the roof side rail 2 via mounting components 10.

The curtain airbag 1 is folded in a compact manner so as to be disposed along the roof side rail 2. The folded curtain airbag 1 can be fitted into and retained inside a tubular cover composed of, for example, a non-woven fabric. The cover may include a plurality of windows such that the tabs 3 are exposed to the exterior of the cover via the windows.

The mounting components 10 may each include a base piece 11 superposed on the roof side rail 2, and projecting pieces 12 extending from the base piece over the folded curtain airbag 1 at both ends of the base piece 11 in the front-back direction of the vehicle. In this embodiment, the base piece 11 has a through-hole 13 at the upper portion for a bolt or a screw. Moreover, the base piece 11 has catching pieces 14 protruding from both sides of the upper portion of the base piece 11 toward the roof side rail 2. The catching pieces 14 are of an L shape and the ends thereof are bent downward. The roof side rail 2 has holes 2a that face the through-holes 13 and slots 2b that face the catching pieces 14.

The lower portion of the base piece 11 extends in the front-back direction of the vehicle to form extended portions. The projecting pieces 12 protrude from the upper sides of the extended portions toward the vehicle cabin so as to be away from the roof side rail 2. In this embodiment, the base piece 11, the projecting pieces 12, and the catching pieces 14 are formed by bending a flat plate. The length of the projecting pieces 12 is smaller than or substantially equal to the width of the folded curtain airbag 1 so as to control the movement of the folded curtain airbag 1 that is caused to spring upward as described below.

The folded curtain airbag 1 is disposed in front of the base pieces 11 and under the projecting pieces 12 of the mounting components 10. The tabs 3 of the curtain airbag 1 are superposed on the base pieces 11.

Pieces of tape 15 may be wound around the mounting components 10 and the folded curtain airbag so as to surround the mounting components 10 and the folded curtain airbag, thereby integrating the mounting components 10 and the folded curtain airbag 1. The pieces of tape 15 may be wound around the outer periphery of the projecting pieces 12. The width of the pieces of tape 15 may be, for example, about 10 mm, and the width of the projecting pieces 12 is set to be larger than or equal to the width of the pieces of tape 15. The pieces of tape 15 are ruptured during the expansion of the curtain airbag 1.

A retaining piece 20 can be superposed on each of the tabs 3 such that each tab 3 is held between a retaining piece 20 and a base piece 11. Each of the retaining pieces 20 has a short cylindrical portion 21 that is fitted into the through-hole 13 of the corresponding base piece 11 via the opening of the corresponding tab 3. The cylindrical portion 21 is fixed to the edges of the through-hole 13 by riveting. The base pieces 11, the tabs 3, and the retaining pieces 20 may be fixed by means of bonding or the like instead of riveting. The retaining pieces 20 can be omitted, and only the base pieces 11 and the tabs 3 may be used.

Figure 4:
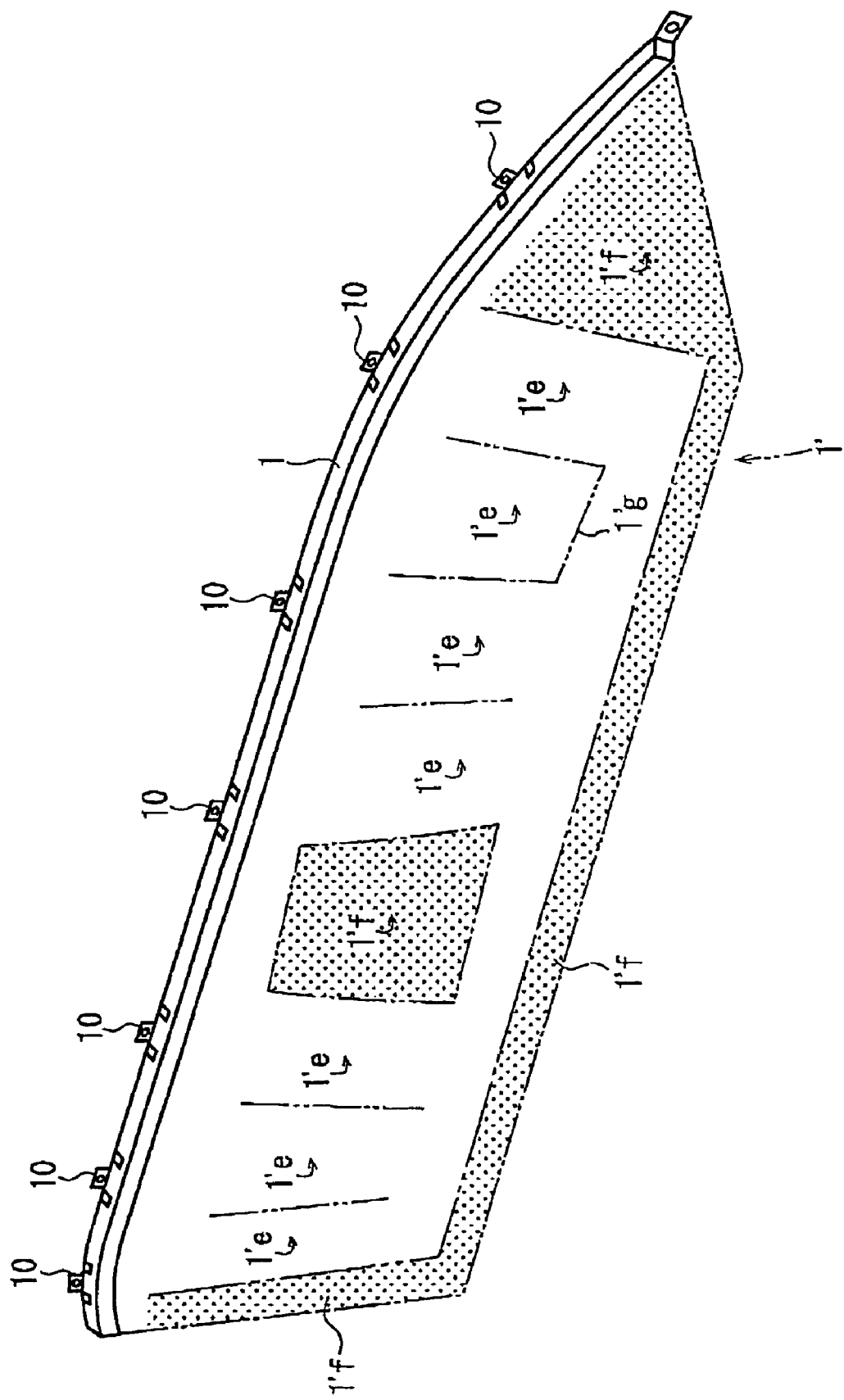
FIG. 4 is a perspective view of a folded curtain airbag with mounting components.

The folded curtain airbag 1 having the mounting components 10 integrated therewith as described above can be disposed along the roof side rail 2, and the catching pieces 14 may be inserted into and hooked on the slots 2b. Thus, each of the through-holes 13 and the corresponding cylindrical portion 21 become coaxial with the corresponding hole 2a. Then, bolts or screws (not shown) are screwed into the holes 2a via the cylindrical portions 21 such that the curtain airbag 1 is mounted onto the roof side rail 2. As shown in FIG. 4, the mounting components 10 are not necessarily attached to the B-pillar facade, but may be attached at any position in the above-described manner. A curtain airbag 1' shown in FIG. 4 is inflated, and can have expanded portions 1'e, non-expanded portions 1'f, and a non-expanded portion 1'g provided by means of seams. An inflator (not shown) may be connected to an end of the curtain airbag 1', or at a predetermined position in the longitudinal direction of the curtain airbag 1'.

Figure 1A:
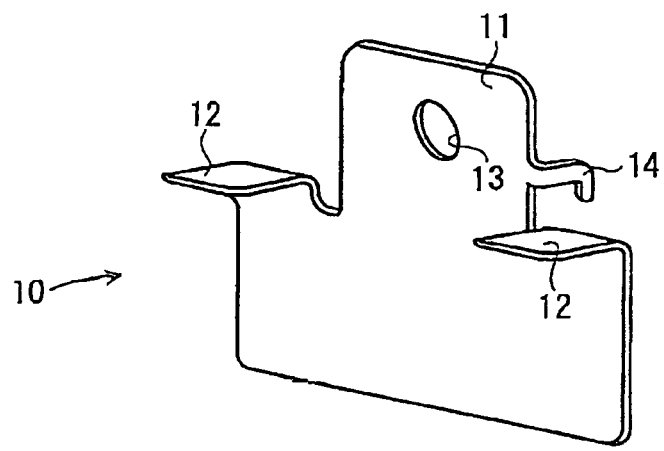
FIG. 1(a) is a perspective view of a mounting component for a curtain airbag.
Figure 1B:
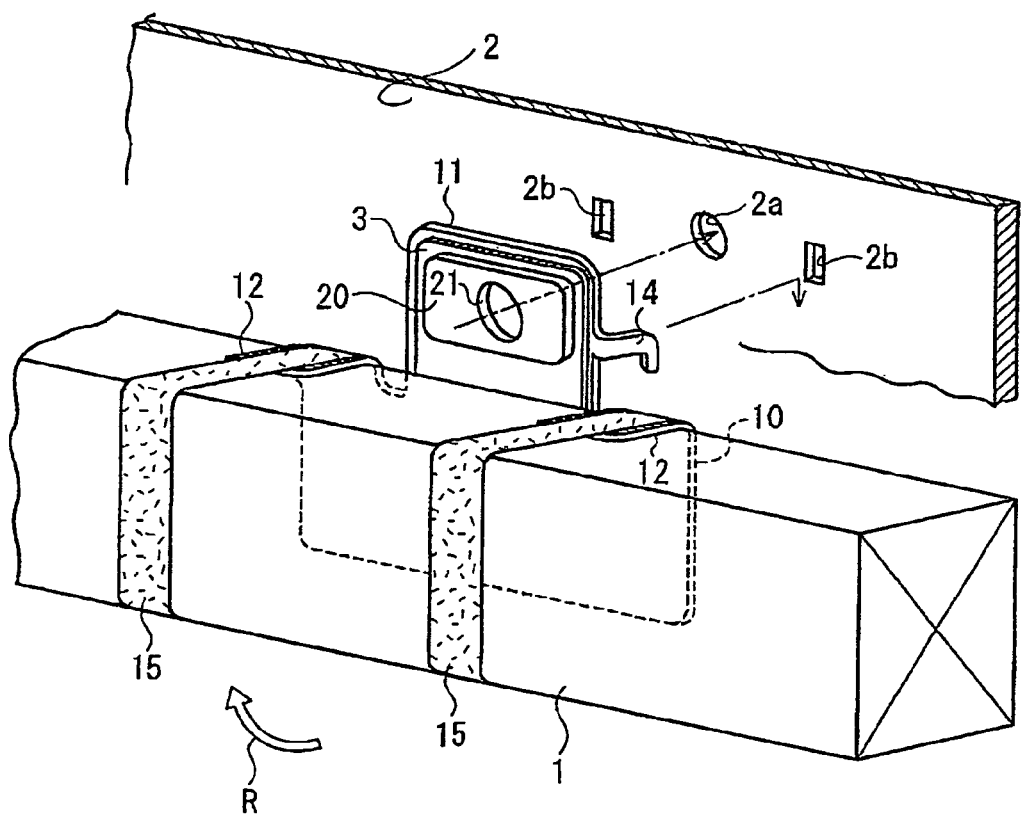
FIG. 1(b) is a partially exploded perspective view showing a mounting structure using the mounting component of FIG. 1(a).

When the folded curtain airbag 1 is made to spring upward in a direction of an arrow R shown in FIG. 1(b) as a result of a vehicle member (such as the B-pillar facade) being struck during the mounting, the movement of the folded curtain airbag 1 is prevented by the projecting pieces 12 extending over the folded curtain airbag 1 and the pieces of tape 15. Therefore, the mounting components 10 are not hidden behind the folded curtain airbag 1, and can be efficiently attached to the roof side rail 2. The upward movement of the folded curtain airbag 1 can be regulated more effectively by the projecting pieces 12 disposed at both ends of the corresponding through-holes 13.

The mounting components 10 can be temporarily fixed to the roof side rail 2 by the catching pieces 14, and thus the attachment using bolts or screws is facilitated. Moreover, the engagement of the catching pieces 14 with the slots 2b can prevent the corotation of the mounting components 10 during the screwing of the bolts or screws.

Figure 2B:
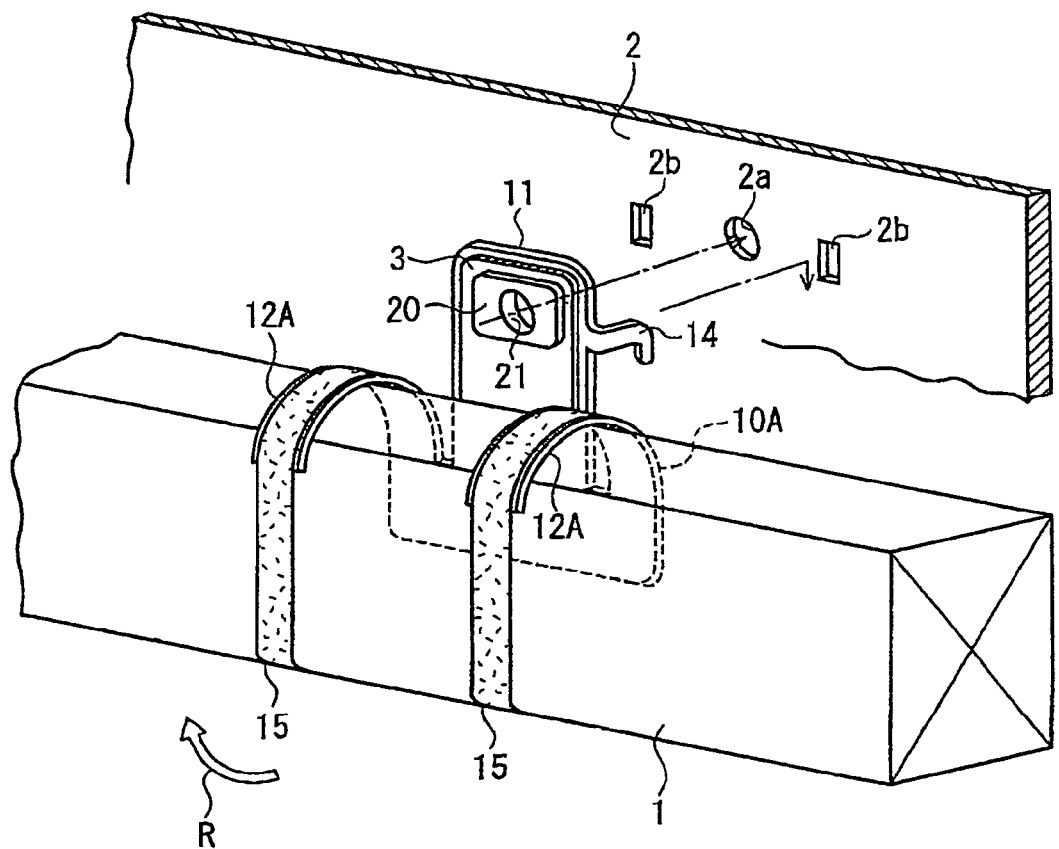
FIG. 2(b) is a partially exploded perspective view showing a mounting structure using the mounting component of FIG. 2(a).

A mounting component according to another embodiment is shown in FIG. 2(a). FIG. 2(b) is a partially exploded perspective view illustrating a mounting structure for a curtain airbag using the mounting component of FIG. 2(a).

The mounting component 10A shown in FIG. 2(a) includes the same structure as the mounting component 10 of FIGS. 1(a) and 1(b) except that projecting pieces 12A are of approximately semi cylindrical shape curving downward. The curved portions of the projecting pieces 12A can have a radius of curvature of, for example, 13 to 15 mm, and may cover a folded curtain airbag 1 in the width direction thereof. The folded curtain airbag 1 can be of an approximately cylindrical shape since the folded curtain airbag 1 is fitted into a tubular cover. Accordingly, the projecting pieces 12A can be preferably disposed so as to be fitted to the upper portion of the approximately cylindrical folded curtain airbag. The mounting components 10A may be attached to the folded curtain airbag 1 as in the embodiment described in FIGS. 1(a) and 1(b).

In the embodiment of FIGS. 2(a) and 2(b), the end of the projecting pieces 12A extend from the upper surface of the folded curtain airbag to the upper portion of the folded curtain airbag adjacent to the vehicle cabin, and thus can prevent the movement of the folded curtain airbag in the direction of the arrow R to a greater extent. Pieces of tape 15 can be wound around the projecting pieces 12A. Because the projecting pieces 12A have no angular portions, the durability of the pieces of tape 15 can be enhanced.

Other structures shown in FIGS. 2(a) and 2(b) are the same as in those shown in FIGS. 1(a) and 1(b), and the same reference numerals correspond to the same components.

Figure 3A:
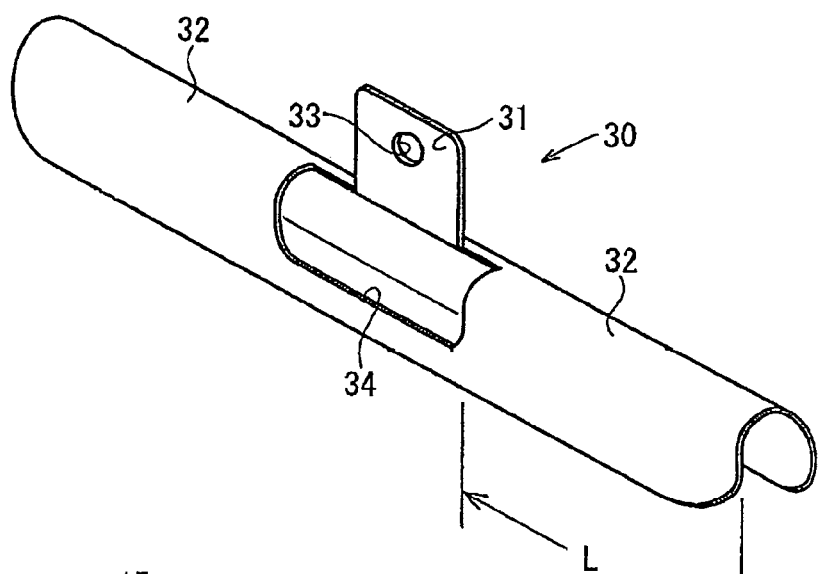
FIG. 3(a) is a perspective view of a mounting component for a curtain airbag according to yet another embodiment.
Figure 3B:
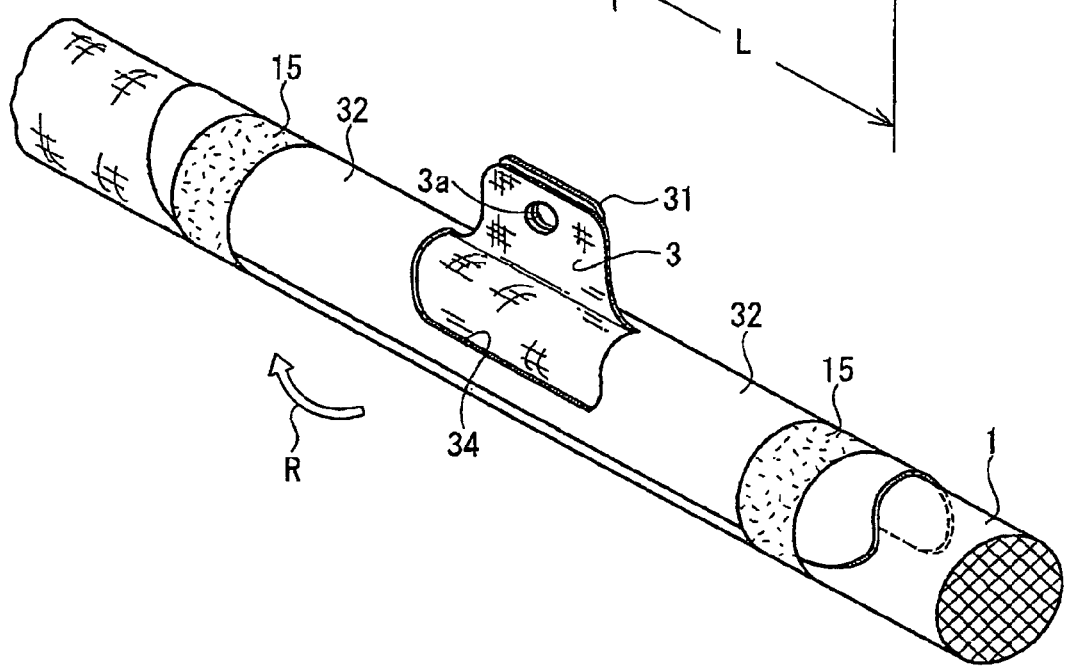
FIG. 3(b) is a perspective view showing a folded curtain airbag using the mounting component of FIG. 3(a).

A mounting component for a curtain airbag according to yet another embodiment is shown in FIG. 3(a). FIG. 3(b) is a perspective view illustrating a folded curtain airbag using the mounting component of FIG. 3(a).

The mounting components 30 according to this embodiment each include a base piece 31 superposed on a surface of a roof side rail 2 (not shown in FIGS. 3(a) and 3(b)) adjacent to the vehicle cabin, and projecting pieces 32 connected to the base piece 31 and disposed at both ends of the base piece 31 in the front-back direction of the vehicle. The projecting pieces 32 are formed of a U-shaped plate curved downward. The base piece 31 is flat, and has a through-hole 33 for a bolt or a screw. The base piece 31 can extend upward from the projecting pieces 32.

Each of the mounting components 30 can be formed of a flat plate. The pair of projecting pieces 32 may be formed by bending the flat plate, and the base piece 31 is formed by uprighting a cut portion of the plate. The mounting component 30 can have an opening 34 created when the base piece 31 is formed. The opening 34 can be located at the center of the mounting component 30 in the longitudinal direction. The length L of the projecting pieces 32 in the front-back direction of the vehicle (the length from the edge of the opening 34 to the end of the mounting component 30 in the longitudinal direction) can preferably be approximately 10 to 200 mm, and in particular, approximately 30 to 200 mm.

A folded curtain airbag 1 can be accommodated inside the projecting pieces 32 and tabs 3 are superposed on the base pieces 31. The tabs 3 each have an opening 3a. The openings 3a are located so as to be coaxial with the through-holes 33 of the base pieces 31.

The folded curtain airbag protrudes downward from the projecting pieces 32. Pieces of tape 15 are wound around the projecting pieces 32 so as to integrate the folded curtain airbag and the mounting components 30.

The curtain airbag 1 is mounted on the roof side rail 2 by screwing bolts or screws in the holes 2a (not shown in FIGS. 3(a) and 3(b)) of the roof side rail 2 via the openings 3a and the through-holes 33 from the side of the tabs 3.

When the folded curtain airbag 1 is made to move in a direction of the arrow R as a result of striking a B-pillar facade or the like during the mounting, the movement of the folded curtain airbag 1 is prevented by the projecting pieces 32 extending over the upper surface of the folded curtain airbag 1. Even when the folded curtain airbag is pressed upward at a position remote from the base pieces 31, the movement of the folded curtain airbag in the direction of the arrow R in the vicinity of the base piece 31 can be prevented because the length of the projecting pieces 32 in the front-back direction of the vehicle is large.

Also in this embodiment, the projecting pieces 32 extend from the upper surface of the folded curtain airbag 1 to the surface adjacent to the vehicle cabin such that the movement of the folded curtain airbag 1 in the direction of the arrow R can be sufficiently prevented. Moreover, the pieces of tape 15 have high durability since the projecting pieces 32 are curved.

The above-described embodiments are merely examples for carrying out the present invention, and embodiments other than those shown in the drawings are permissible in relation to the shapes of the vehicle body at the mounting positions. The fixing mechanism is not limited to bolts or screws, but may include other mechanisms such as clips.

The priority application, Japanese Patent Application No. 2005-272607, filed on Sep. 20, 2005, is incorporated herein by reference in their entirety.

Given the disclosure of the present invention, one versed in the art would appreciate that there may be other embodiments and modifications within the scope and spirit of the invention. Accordingly, all modifications attainable by one versed in the art from the present disclosure within the scope and spirit of the present invention are to be included as further embodiments of the present invention. The scope of the present invention is to be defined as set forth in the following claims.

What is claimed is:

1. A mounting component for mounting a folded curtain airbag that extends along a vehicle body, comprising:
    a base piece configured to be attached to the vehicle body; and
    projecting pieces extending from both ends of the base piece for extending over the folded curtain airbag,
    wherein the base piece and the projecting pieces are integrated with each other such that the base piece protrudes vertically above the projecting pieces,
    wherein the projecting pieces are laterally bent portions of a plate, the base piece is a flat partial cut-out portion in the plate that is vertically upright relative to the laterally bent portions, and a lateral opening in the plate is located directly adjacent to the laterally bent portions and an edge of the partial cut-out portion,
    wherein the laterally bent portions of the projecting pieces have attached ends connecting the projecting pieces with the plate and unattached ends configured to remain suspended outward from a rest of the plate, and
    wherein the projecting pieces are configured to prevent movement of the folded curtain airbag by having folds of the airbag abutting against the projecting pieces and the unattached ends maintain their outward suspension from the rest of the plate.

2. The mounting component according to claim 1, wherein each of the projecting pieces comprises a hanging portion at an end thereof for extending over a surface of the folded curtain airbag.

3. The mounting component according to claim 2, wherein a longitudinal section of the projecting pieces is concaved in a downward direction.

4. The mounting component according to claim 1, wherein the width of the projecting pieces is 10 mm or more.

5. The mounting component according to claim 1, further comprising a catching piece for engagement with a catching hole located in the vehicle body.

6. The mounting component according to claim 1, wherein the lateral opening is an enclosed aperture that is bordered by the laterally bent portions, the edge of the partial cut-out portion and a portion of the plate connecting the laterally bent portions together.

7. The mounting component according to claim 1, wherein the base piece comprises an aperture for mounting the mounting component to the vehicle body, and wherein the aperture is vertically above the projecting pieces.

8. An occupant restraint device for a vehicle comprising:
    a folded curtain airbag; and
    a mounting component for mounting the folded curtain airbag to the vehicle comprising:
        a base piece configured to be attached to a vehicle body; and
        projecting pieces extending from both ends of the base piece for extending over the folded curtain airbag,
    wherein the base piece and the projecting pieces are integrated with each other such that the base piece protrudes vertically above the projecting pieces,
    wherein the folded curtain airbag includes a protruding tab superposed on the base piece of the mounting component, wherein the tab is configured for attachment to the vehicle body via the base piece, wherein the projecting pieces are laterally bent portions of a plate, the base piece is a flat partial cut-out portion in the plate that is vertically upright relative to the laterally bent portions, and a lateral opening in the plate is located directly adjacent to the laterally bent portions and an edge of the partial cut-out portion, wherein the laterally bent portions of the projecting pieces have attached ends connecting the projecting pieces with the plate and unattached ends configured to remain suspended outward from a rest of the plate, and wherein the projecting pieces are configured to prevent movement of the folded curtain airbag by having folds of the airbag abutting against the projecting pieces and the unattached ends maintain their outward suspension from the rest of the plate.

9. The device according to claim 8, further comprising a retaining piece superposed on a surface of the tab; and wherein the retaining piece and the base piece are attached to each other.

10. The device according to claim 8, wherein the folded curtain airbag and the mounting component are attached to each other by tape members wound around the folded curtain airbag and the mounting component.

11. The device according to claim 10, wherein the tape members surround outer peripheries of the projecting pieces.

12. An occupant restraint device for a vehicle comprising:
a folded curtain airbag; and
a mounting component for mounting the folded curtain airbag to the vehicle comprising:
  a flat base piece configured to be attached to a vehicle body, and
  projecting pieces connected to the base piece and disposed at both ends of the base piece in a longitudinal direction of the vehicle, wherein the projecting pieces are U-shaped downward curved portions of a plate and the base piece is a flat partial cut-out portion in the plate that is vertically upright relative to the curved portions, and a lateral opening in the plate is located directly adjacent to the curved portions and an edge of the partial cut-out portion, and wherein the curved portions of the projecting pieces have unattached ends configured to remain suspended outward from a rest of the plate.

13. The device according to claim 12, wherein the lateral opening is an enclosed aperture that is bordered by the downward curved portions, the edge of the partial cut-out portion and a portion of the plate connecting ends of the downward curved portions together.

14. The device according to claim 12, wherein a length of the projecting pieces in the longitudinal direction of the vehicle is approximately 10 to 200 mm.

15. The device according to claim 12, wherein the folded curtain airbag is accommodated inside the downward curved portions of the projecting pieces and a tab of the airbag is superposed on the base piece.

16. The device according to claim 15, wherein the tab has an opening located such that the opening on the tab aligns with a through-hole on the base piece.

17. The device according to claim 12, wherein pieces of tape are wound around the projecting pieces.

18. The device according to claim 12, wherein the projecting pieces are configured to prevent movement of the folded curtain airbag by having folds of the airbag abutting against the projecting pieces and the unattached ends maintain their outward suspension from the rest of the plate.

* * * * *